United States Patent
Ishikawa

(10) Patent No.: US 11,681,809 B2
(45) Date of Patent: Jun. 20, 2023

(54) INFORMATION PROCESSING APPARATUS, CONTROL METHOD, AND STORAGE MEDIUM

(71) Applicant: CANON KABUSHIKI KAISHA, Tokyo (JP)

(72) Inventor: Akira Ishikawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 138 days.

(21) Appl. No.: 16/383,252

(22) Filed: Apr. 12, 2019

(65) Prior Publication Data
US 2019/0325138 A1  Oct. 24, 2019

(30) Foreign Application Priority Data

Apr. 19, 2018  (JP) .............................. JP2018-080775

(51) Int. Cl.
*G06F 21/57* (2013.01)

(52) U.S. Cl.
CPC ...... *G06F 21/572* (2013.01); *G06F 2221/033* (2013.01)

(58) Field of Classification Search
CPC .. G06F 21/00; G06F 21/50–57; G06F 21/121; G06F 21/126; G06F 21/562–564; G06F 21/572; G06F 21/575; G06F 21/577; G06F 9/44589; G06F 2221/033; G06F 21/51; G06F 21/52; G06F 21/566
See application file for complete search history.

(56) References Cited

U.S. PATENT DOCUMENTS

| | | | | |
|---|---|---|---|---|
| 6,149,522 A | * | 11/2000 | Alcorn | G06Q 50/34 463/29 |
| 8,239,686 B1 | * | 8/2012 | Hodzic | G06F 21/575 713/187 |
| 9,195,832 B1 | * | 11/2015 | Rusakov | G06F 9/4401 |
| 10,243,995 B2 | * | 3/2019 | Tsuchitoi | G06F 21/608 |
| RE47,364 E | * | 4/2019 | Hodzic | G06F 21/51 |
| 2001/0032319 A1 | * | 10/2001 | Setlak | G06F 21/32 726/19 |

(Continued)

FOREIGN PATENT DOCUMENTS

| | | |
|---|---|---|
| JP | 2007-141044 A | 6/2007 |
| JP | 2010-182196 A | 8/2010 |
| JP | 2017-153044 A | 8/2017 |

OTHER PUBLICATIONS

Kuan-Jen Lin and Chin-Yi Wang, "Using TPM to improve boot security at BIOS layer," 2012 IEEE International Conference on Consumer Electronics (ICCE), 2012, pp. 376-377, doi: 10.1109/ICCE.2012.6161909.*

*Primary Examiner* — Richard A McCoy
(74) *Attorney, Agent, or Firm* — Canon U.S.A., Inc. I.P. Division

(57) ABSTRACT

An information processing apparatus includes a first verification unit configured to perform hardware verification of the hardware by using a hardware verification unit, and if the hardware verification is successful, performs a software verification of software stored in a storage unit. If both verifications are successful and a particular function is executed, a second verification unit performs software verification of a program stored in the storage unit. And, if one or both of the verifications is unsuccessful, a restriction unit restricts use of the information processing apparatus.

20 Claims, 10 Drawing Sheets

(56) References Cited

U.S. PATENT DOCUMENTS

| | | | |
|---|---|---|---|
| 2003/0167354 A1* | 9/2003 | Peppers | G06F 9/4406 713/1 |
| 2005/0060530 A1* | 3/2005 | Lin | G06F 8/65 713/2 |
| 2005/0132357 A1* | 6/2005 | Shell | G06F 21/51 717/174 |
| 2006/0079333 A1* | 4/2006 | Morrow | G06F 21/10 463/43 |
| 2006/0168372 A1* | 7/2006 | Smith | G06F 9/4413 710/62 |
| 2006/0225067 A1* | 10/2006 | Yang | G06F 8/65 717/168 |
| 2007/0061880 A1* | 3/2007 | Depta | G06F 21/575 726/20 |
| 2008/0046781 A1* | 2/2008 | Childs | G06F 21/56 714/15 |
| 2008/0077783 A1* | 3/2008 | Lu | G06F 9/4401 713/1 |
| 2008/0301440 A1* | 12/2008 | Plouffe, Jr. | G06F 21/51 713/164 |
| 2008/0301468 A1* | 12/2008 | Murase | G06F 21/52 713/193 |
| 2008/0301469 A1* | 12/2008 | Plouffe, Jr. | G06F 21/74 713/193 |
| 2009/0132829 A1* | 5/2009 | Ohhashi | G06F 21/51 713/187 |
| 2009/0204806 A1* | 8/2009 | Kanemura | H04L 9/0822 713/155 |
| 2010/0058066 A1* | 3/2010 | Wang | G06F 21/80 726/2 |
| 2010/0325628 A1* | 12/2010 | Haga | G06F 21/575 718/1 |
| 2013/0117006 A1* | 5/2013 | Varghese | G06F 21/53 703/22 |
| 2014/0289794 A1* | 9/2014 | Raleigh | G06F 21/575 726/1 |
| 2014/0298420 A1* | 10/2014 | Barton | H04L 63/102 726/4 |
| 2015/0040246 A1* | 2/2015 | Yuen | H04W 12/0023 726/30 |
| 2015/0220734 A1* | 8/2015 | Nalluri | G06F 21/6218 726/23 |
| 2016/0292422 A1* | 10/2016 | Hayashi | G06F 21/57 |
| 2017/0220795 A1* | 8/2017 | Suginaka | G06F 9/445 |
| 2018/0096132 A1* | 4/2018 | Abe | G06F 9/442 |
| 2018/0321947 A1* | 11/2018 | Liu | G06F 9/4401 |

* cited by examiner

| 3001 | 3002 |
|---|---|
| /bin/cat | 270c2468bd4fdbc9e89ae71 |
| /lib/libc.so | e26b6d7fdd32a3e50cfb5cb |
| /lib/libm.so | 887xb9019a76dcdbbfefe25 |

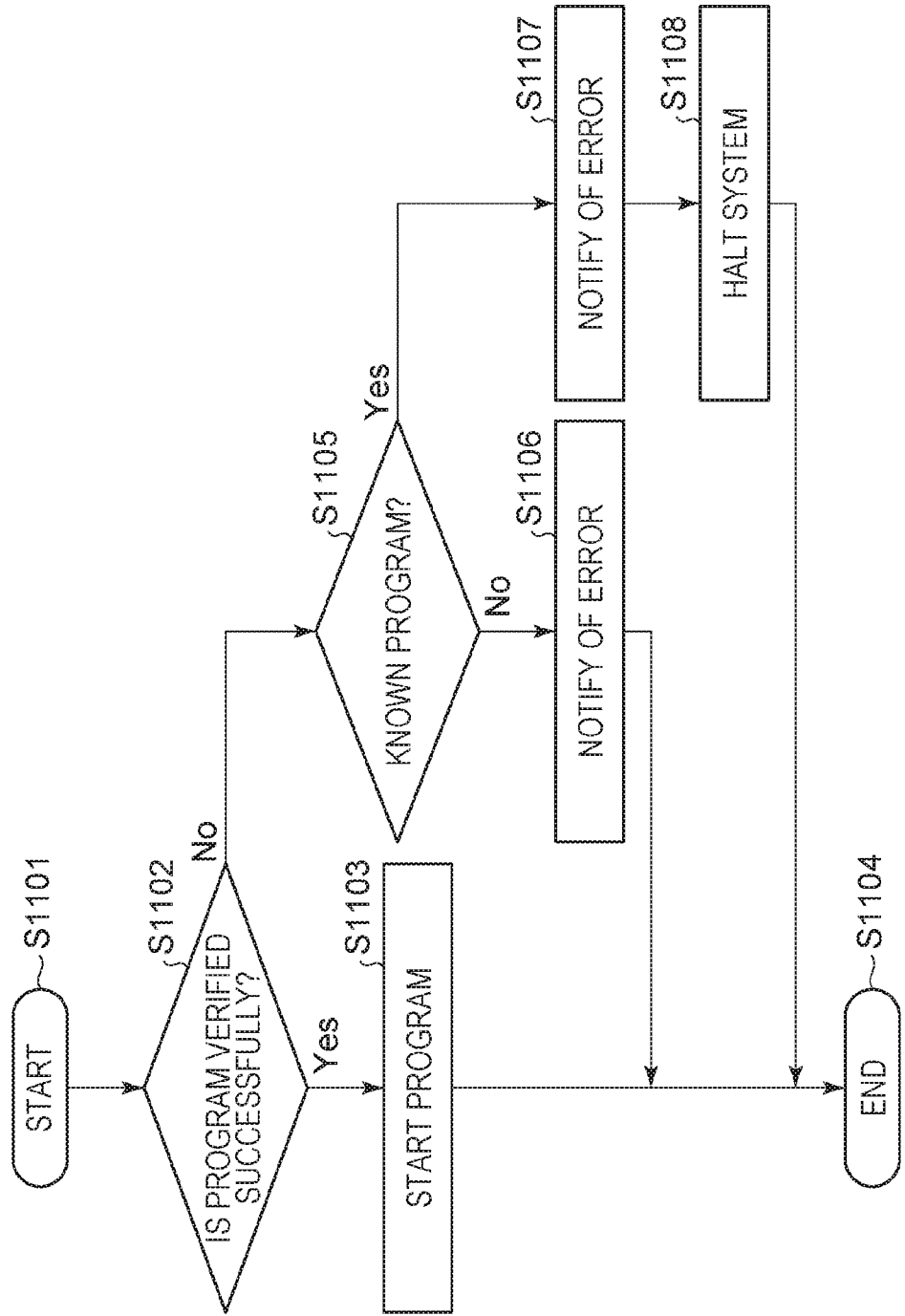

INFORMATION PROCESSING APPARATUS, CONTROL METHOD, AND STORAGE MEDIUM

BACKGROUND OF THE INVENTION

Field of the Invention

The present disclosure generally relates to an information processing apparatus able to perform verification of hardware and software and more specifically able to detect tampering of software.

Description of the Related Art

Software that controls an apparatus can be tampered with and used illegally by a third person. There is a possibility that by an illegal use of software, an information asset is stolen, or a second system is attacked via an attack to a first system, which may result in huge damage to an owner of the apparatus. To protect the apparatus from such attacks, it has been proposed to verify, when an apparatus is used, that software has not been tampered with (see Japanese Patent Laid-Open No. 2017-153044).

With increasing functionality and complexity of an apparatus, it is becoming more popular to divide software into pieces each providing one function and install the divided pieces of software in an apparatus and execute the software in units of divided pieces as required. In one example of a method of dividing the software, a plurality of storage media are installed in an apparatus, and divided pieces of software are installed in the respective storage media. In another method, a file system is built on a storage medium, and divided pieces of software are installed in respective different files. In general, in computers or computer-embedded apparatuses, the two methods described above are used to realize complicated functionality of software.

SUMMARY OF THE INVENTION

In view of the above, the present disclosure provides a system configured as described below.

In an aspect, the present disclosure provides an information processing apparatus including a hardware verification unit, a storage unit configured to store a plurality of programs, and a control unit configured to execute the plurality of programs, the information processing apparatus further including a first verification unit configured to perform a hardware verification of hardware by using the hardware verification unit, and if the hardware verification is successful, perform a software verification of software stored in the storage unit by using the control unit, a second verification unit configured to, when a particular function is executed after completion of starting of the information processing apparatus initiated in response to a success in the two verifications, perform software verification of a program stored in the storage unit by using the control unit, and a restriction unit configured to, in a case where the verification by the first verification unit or the verification by the second verification unit fails, restricts use of the information processing apparatus.

Further features of the present disclosure will become apparent from the following description of exemplary embodiments with reference to the attached drawings.

BRIEF DESCRIPTION OF THE DRAWINGS

FIG. 11 is a flow chart illustrating a process performed in an MFP according to an embodiment.

DESCRIPTION OF THE EMBODIMENTS

To ensure that software, which is going to be used by a user, is not tampered with, it is necessary to verify the software and then successively execute the software. If the verification is performed in advance a certain period before the execution, it is difficult to eliminate the possibility that the software is tampered with during the period after the verification to the execution. An example of a verification method is to previously generate a hash value, as a correct value, of the software, and re-calculate the hash value of the software of interest during the verification. If the re-calculated hash value is not equal to the correct value, it is determined that the software has been tampered with.

In the software verification process performed when software is executed, the process of performing the verification itself is realized using software. Therefore, if there is a possibility that the software used in verification has been tampered with, a verification result may not be reliable.

In view of the above, the present disclosure provides a technique of verifying a validity of device control software by using software whose validity is verified by a high-reliability verification method thereby making it possible to securely use the device.

First Embodiment

A first embodiment of the present disclosure is described below with reference to drawings. In the embodiment described below, explanations are given as to a software verification process performed when a system is started or when a function is executed, a process of updating a correct value when software is updated, and a process of controlling an operation unit in verification setting. Although an MFP (Multi-Function Peripheral) is taken as an example in the following description of the embodiment, the present disclosure is also applicable to any information processing apparatus other than the MFP.

Figure 1:
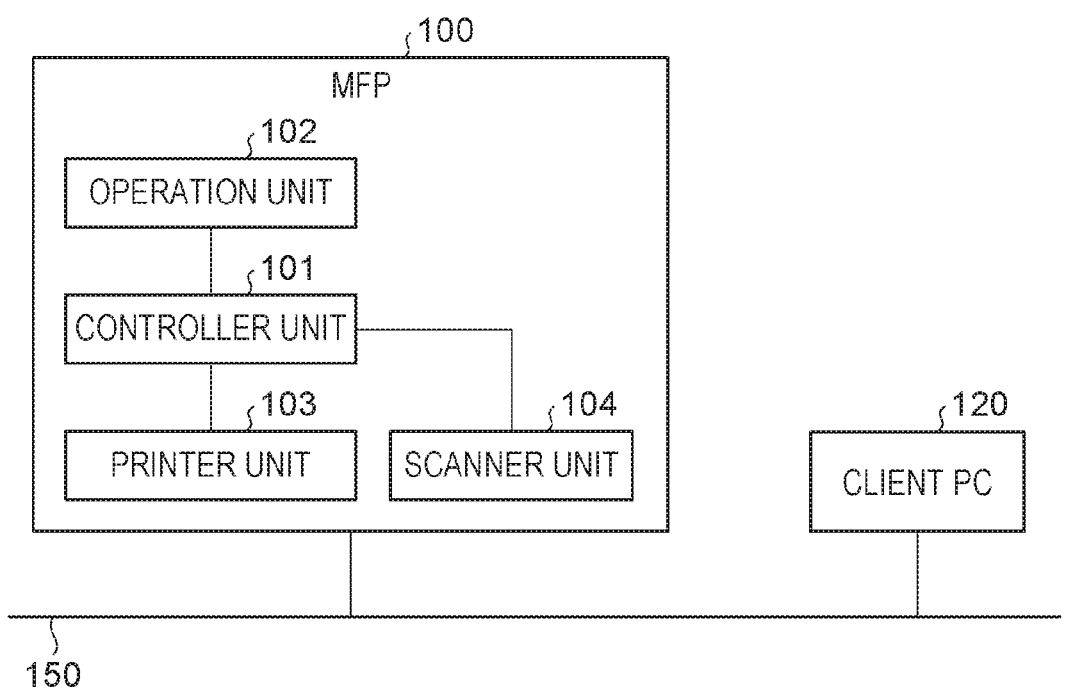
FIG. 1 is a configuration block diagram illustrating a manner in which an MFP according to an embodiment is connected to a client PC.

FIG. 1 is a block diagram illustrating a manner in which an MFP according to the embodiment is connected to a client PC. The MFP 100 is connected to the client PC 120 via a LAN 150. The MFP 100 includes an operation unit 102 configured to perform inputting/outputting from/to a user. The MFP 100 includes a printer unit 103 configured to output electronic data on a paper medium. The MFP 100 also includes a scanner unit 104 configured to read a paper medium and convert into electronic data. The operation unit 102, the printer unit 103, and the scanner unit 104 are connected to the controller unit 101, and the controller unit 101 controls them such that a function of the MFP is realized. The client PC 120 performs a process of transmitting a print job to the MFP 100.

Figure 2:
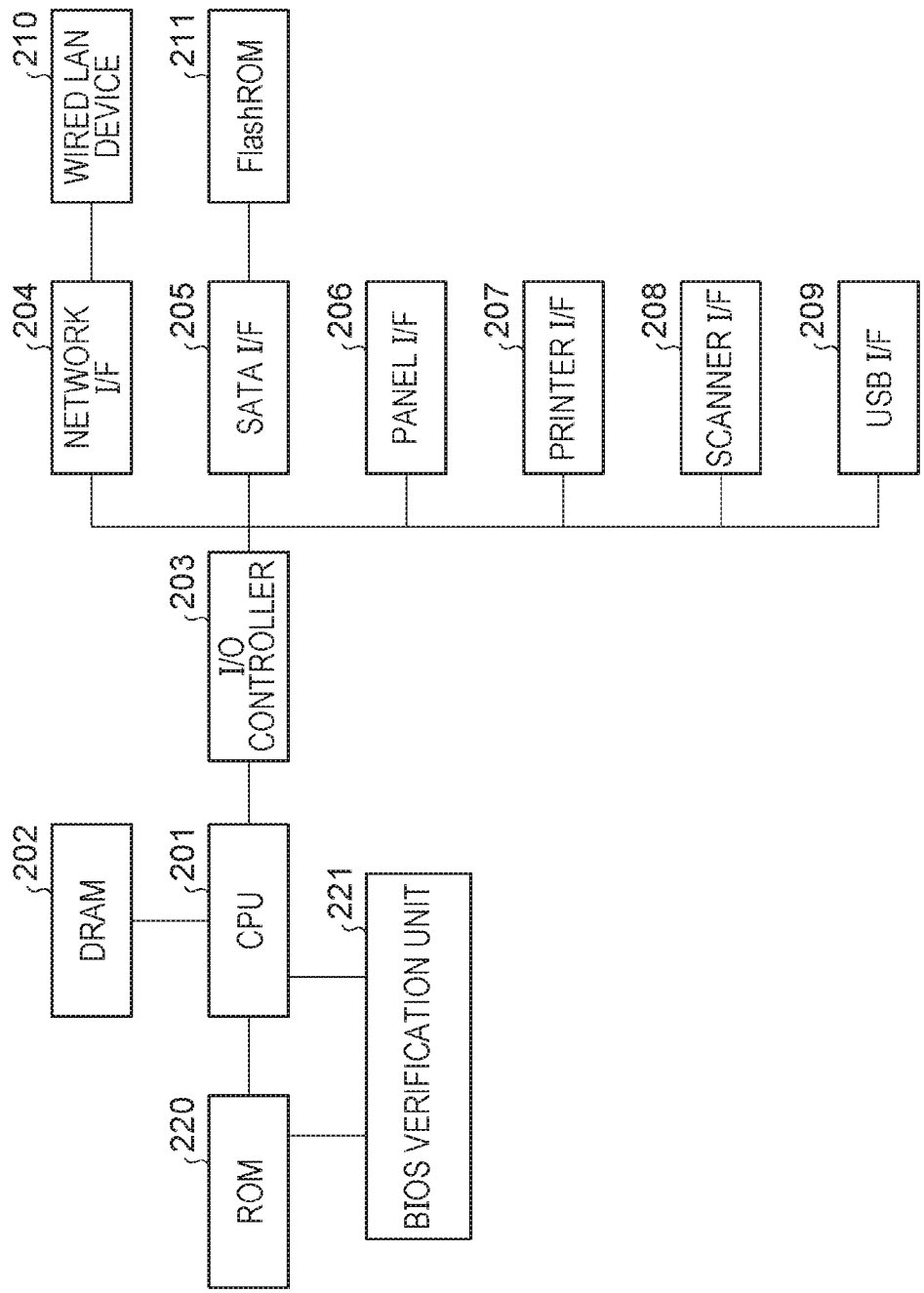
FIG. 2 is a diagram illustrating an internal configuration of a controller unit of an MFP.

FIG. 2 is a block diagram illustrating details of the controller unit 101 of the MFP 100. The CPU 201 is involved with main computational processing performed in the controller 101. The CPU 201 is connected to a DRAM 202 via a bus. The DRAM 202 is used by the CPU 201 as a work memory for storing program data indicating an operation instruction executed by the CPU 201 in a computational process or for temporarily storing data in a process. The CPU 201 is connected to an I/O controller 203 via a bus. The I/O controller 203 performs inputting/outputting from/to various devices according to an instruction given by the CPU 201. The I/O controller 203 is connected to an SATA (Serial Advanced Technology Attachment) I/F 205 which is in turn connected to a FlashROM 211. The CPU 201 uses the FlashROM 211 to store a program to realize a function of the MFP and to permanently store a document file. The I/O controller 203 is connected to a network I/F 204, which is in turn connected to a wired LAN device 210.

The CPU 201 realizes communication via the LAN 150 by controlling the wired LAN device 210 via the network I/F 204. The I/O controller 203 is connected to a panel I/F 206. The CPU 201 realizes inputting/outputting from/to a user using the operation unit 102 via the panel I/F 206. The I/O controller 203 is connected to a printer I/F 207. The CPU 201 realizes a process of outputting to a paper medium using the printer unit 103 via the printer I/F 207. The I/O controller 203 is connected to a scanner I/F 208. The CPU 201 realizes a process of reading a document using the scanner unit 104 via the scanner I/F 208. The I/O controller 203 is connected to a USB I/F 209 thereby making it possible to control a device connected to the USB I/F 209. A ROM 220 is connected to the CPU 201 via a bus. A control program for realizing BIOS (Basic Input Output System) is stored in the ROM 220.

A BIOS verification unit 221 is connected to the ROM 220 and the CPU 201 via a bus. The BIOS verification unit 221 verifies BIOS data stored in the ROM 220 and issues a BIOS boot instruction to the CPU 201. It should be understood that the BIOS verification unit 221 is a hardware unit, and the BIOS verification is performed by hardware. The bus connecting the BIOS verification unit 221 and the CPU 201 is disposed on the same chip as the chip on which the BIOS verification unit 221 and the CPU 201 are disposed, or the BIOS verification unit 221, the bus, and the CPU 201 are disposed in another similar manner such that the bus cannot be physically seen from the outside and thus it becomes difficult to manipulate. In the first embodiment, it is assumed that the control mechanism of the BIOS verification unit 221 is realized by hardware in the form of an integrated circuit. Alternatively, a dedicated CPU, a ROM in which control software is stored, and other elements may be disposed in a single chip such that no change is possible after being produced.

To execute a copy function, the CPU 201 loads program data from the FlashROM 211 into the DRAM 202 via the SATA I/F 205. According to the program loaded in the DRAM 202, the CPU 201 detects, via the panel I/F 206, a copy instruction given by a user by operating the operation unit 102. When the CPU 201 detects the copy instruction, the CPU 201 receives a document as electronic data from the scanner unit 104 via the scanner I/F 208, and the CPU 201 stores the received data in the DRAM 202. The CPU 201 performs a color conversion process or the like on image data stored in the DRAM 202 such that a proper output image is achieved. The CPU 201 transfer the image data stored in the DRAM 202 to the printer unit 103 via the printer I/F 207 and performs an output process to form the image on a paper medium.

In a case where PDL printing is performed, the client PC 120 issues a print instruction via the LAN 150. The CPU 201 loads program data from the FlashROM 211 into the DRAM 202 via the SATA I/F 205. According to the program loaded in the DRAM 202, the CPU 201 detects the print instruction via the network I/F 204. When the CPU 201 detects a PDL transmission instruction, the CPU 201 receives print data via the network I/F 204 and stores the print data in the FlashROM 211 via the SATA I/F 205. After the storing of the print data is completed, the CPU 201 loads the print data stored in the FlashROM 211 into the DRAM 202 in the form of image data. The CPU 201 performs a color conversion process or the like on the image data stored in the DRAM 202 such that a proper output image is achieved. The CPU 201 transfers the image data stored in the DRAM 202 to the printer unit 103 via the printer I/F 207 and performs an output process to form the image on a paper medium.

Figure 3:
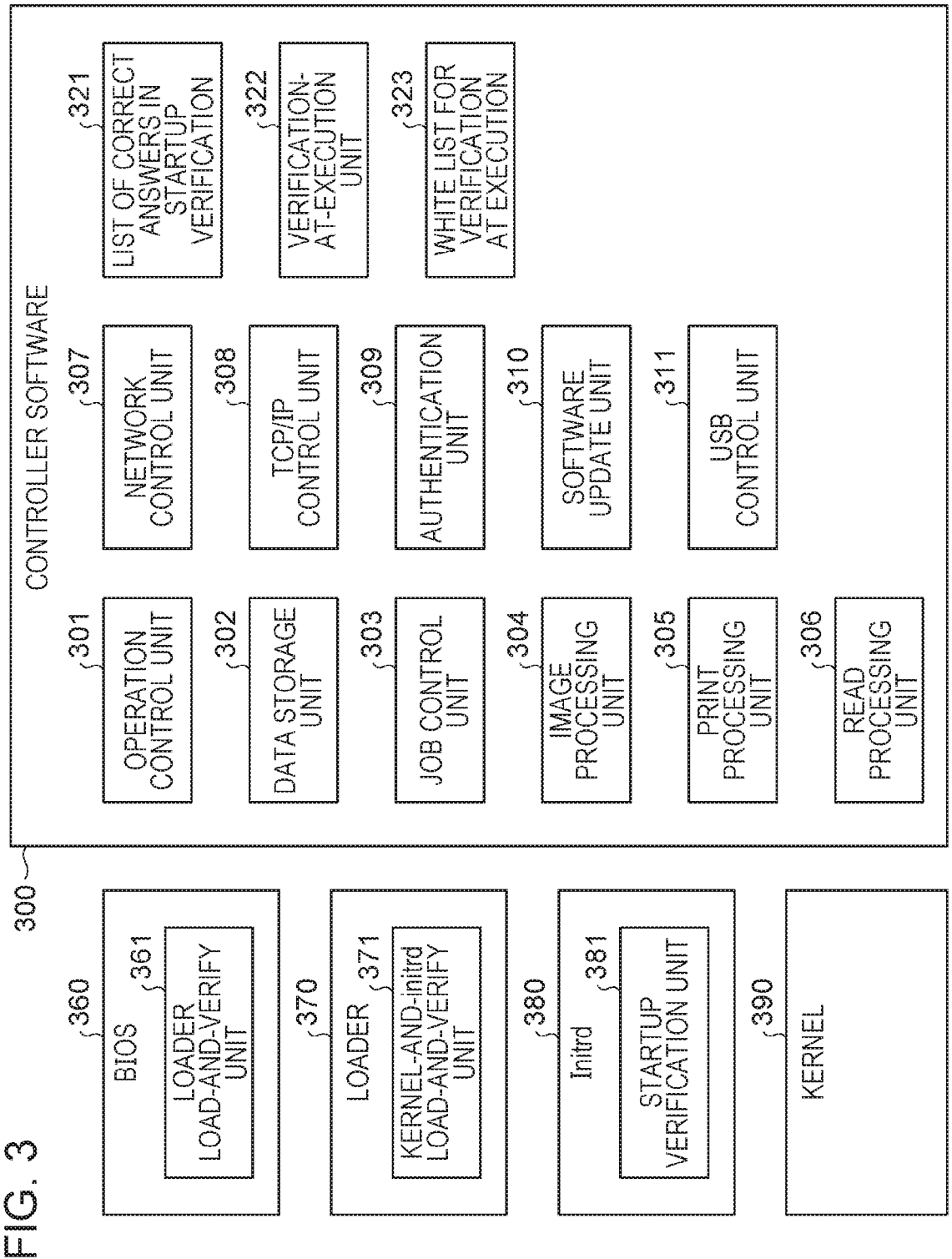
FIG. 3 is a block diagram illustrating a configuration of software executed in a controller of an MFP.

FIG. 3 is a block diagram illustrating a structure of software executed by the controller unit 101 of the MFP 100. More specifically, this software is executed by the CPU 201 in the controller unit 101. The CPU 201 executes BIOS 360 stored in the ROM 220. The CPU 201 executes a loader 370, initial RAM disk (initrd) 380, and controller software 300 stored in the FlashROM 211 after loading them in the DRAM 202. The BIOS 360 executes a basic process when the CPU 201 controls the I/O controller 203 or the DRAM 202.

The BIOS 360 includes internal control software functioning as BIOS and signature data assigned to the control software. A loader load-and-verify unit 361 is included in the control software of the BIOS 360. The loader load-and-verify unit 361 includes a public key corresponding to a process for verifying the loader and the signature assigned to the loader. The BIOS 360 also includes a process of loading the loader 370 from the FlashROM 211 and starting the loader 370. The loader 370 executes a process of loading a kernel 390 and initrd 380 from the FlashROM 211 and starting them. The loader 370 includes internal control software functioning as the loader and signature data assigned to the control software.

A kernel-and-initrd load-and-verify unit 371 is included in the loader 370. The kernel-and-initrd load-and-verify unit 371 includes a signature assigned to a process of verifying the kernel and initrd and to the kernel and initrd. The initrd 380 executes a process of loading the controller software 300 from the FlashROM 211 and starting the loaded controller software 300. The initrd 380 includes internal control software functioning as initrd and signature data assigned to the control software. A startup verification unit 381 is included in the initrd 380. The startup verification unit 381 includes a public key corresponding to an assigned signature and is configured to perform a process of verifying all program files forming the controller software 300. Note that a secret key corresponding to any signature data is used only when software is developed, and is not generally distributed.

The operation control unit 301 displays a screen image for a user on the operation unit 102. The operation control unit 301 detects an operation performed by a user and executes a process associated with a screen component such as a button. A data storage unit 302 stores or reads data in or from the FlashROM 211 according to a request issued by another control unit. For example, in a case where a user wants to change some device setting, data is input by the user via the operation unit 102. The data is detected by the operation control unit 301 and stored as a setting value in the FlashROM 211 by the data storage unit 302 in accordance with the instruction issued by the operation control unit 301. When the system is started or when a change in setting is detected, a network control unit 307 performs network setting in terms of an IP address or the like on a TCP/IP control unit 308 according to a setting value stored in the data storage unit 302.

The TCP/IP control unit 308 performs transmission/reception of a network packet via the network I/F 204 in accordance with an instruction given by another control unit. A job control unit 303 controls a job execution according to an instruction given by another control unit. An image processing unit 304 processes image data into a form proper for a purpose in accordance with an instruction given by the job control unit 303. A print processing unit 305 outputs or prints an image on a paper medium via the printer I/F 207 according to an instruction given by the job control unit 303. A read processing unit 306 reads a set document via the scanner I/F 208 according to an instruction given by the job control unit 303.

An authentication unit 309 performs a process of determining whether an operator is an administrator when an operation to be performed needs administrative privileges. A software update unit 310 performs a process of updating, in an installed environment, a program file forming the controller software 300. A USB control unit 311 controls an arbitrary USB-connected device by controlling the USB I/F 209. A list of correct answers in startup verification 321 is a list of correct answers used in verification by the startup verification unit 381. A verification-at-execution unit 322 includes a process of verifying all program files forming the controller software 300 when program files are executed. A white list for verification at execution 323 is a list of correct answers used in a verification process by the verification-at-execution unit 322.

For example, when a copy function is executed, the operation control unit 301 detects a copy function start request and instructs the job control unit 303 to perform a copy operation. The job control unit 303 instructs the read processing unit 306 to perform a document read operation, thereby acquiring a scanned image. The job control unit 303 instructs the image processing unit 304 to convert the scanned image into a proper form for use in printing. The job control unit 303 instructs the print processing unit 305 to perform printing thereby outputting a copy result.

Figures 4, 5:
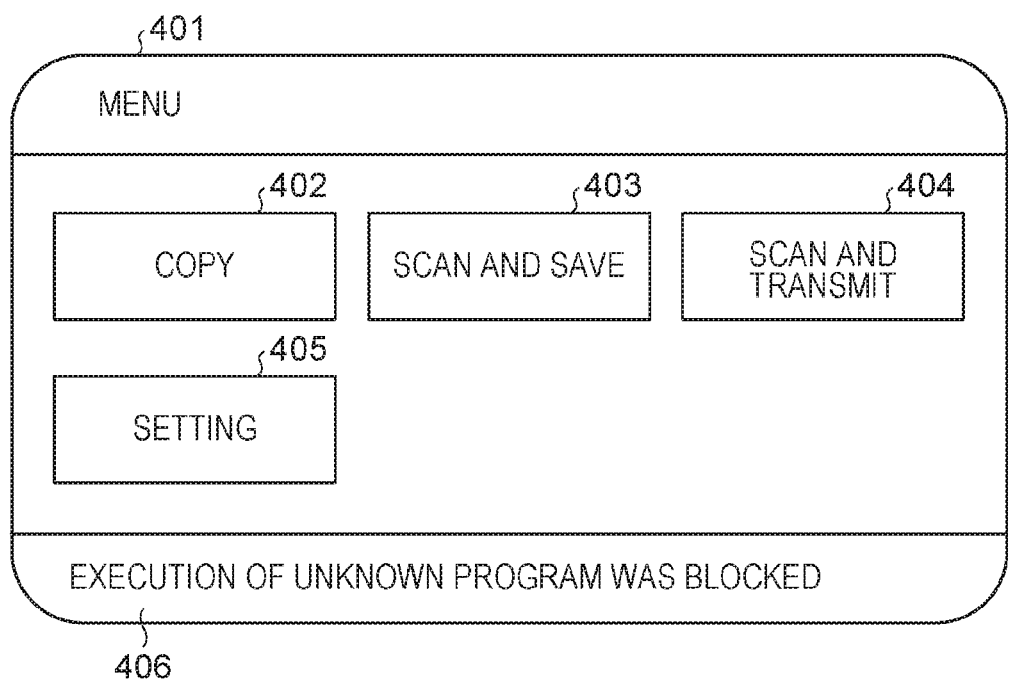
FIG. 4 is a diagram illustrating an example of a data format of a list of correct answers and a white list.
FIG. 5 is a diagram illustrating a configuration of a screen for use in setting.

FIG. 4 illustrates an example of a data format of the list of correct answers in startup verification 321 and the white list for verification at execution 323. In this example, a combination of a file name 3001 and a hash value 3002 is taken for each of all program files included in the controller software 300 and described in the form of a list. The program files include an OS program, and/or an application program that provides a function. The data includes at least a file name, a location where the file is installed (in a directory), and a hash value calculated form the file, and these pieces of information such as the hash value are described in the list.

The list of correct answers in startup verification 321 and the white list for verification at execution 323 may be the same file. However, in the present embodiment, taking into account a difference in generation timing and a difference in manner in which they are used, they are generated and stored as different files. The purpose of the white list for verification at execution 323 is for verifying an application program corresponding to a function selected by a user, and from the point of view of its purpose, only the hash value of the application program is described in the white list for verification at execution 323.

FIG. 5 illustrates an example of a menu screen 401 displayed on the operation unit 102. This menu screen 401 is used by a user to issue an instruction to execute various functions of the MFP 100. A button 402 is used by a user to specify a copy function. A button 403 is used by a user to specify a scan-and-save function. A button 404 is used by a user to specify a scan-and-transmit function. A button 405 is used by a user to issue a setting change instruction. When the button 405 is pressed, a setting screen 501 is opened. A message display area 406 is an area in which various messages to a user are displayed during the operation of the device.

Figure 6:
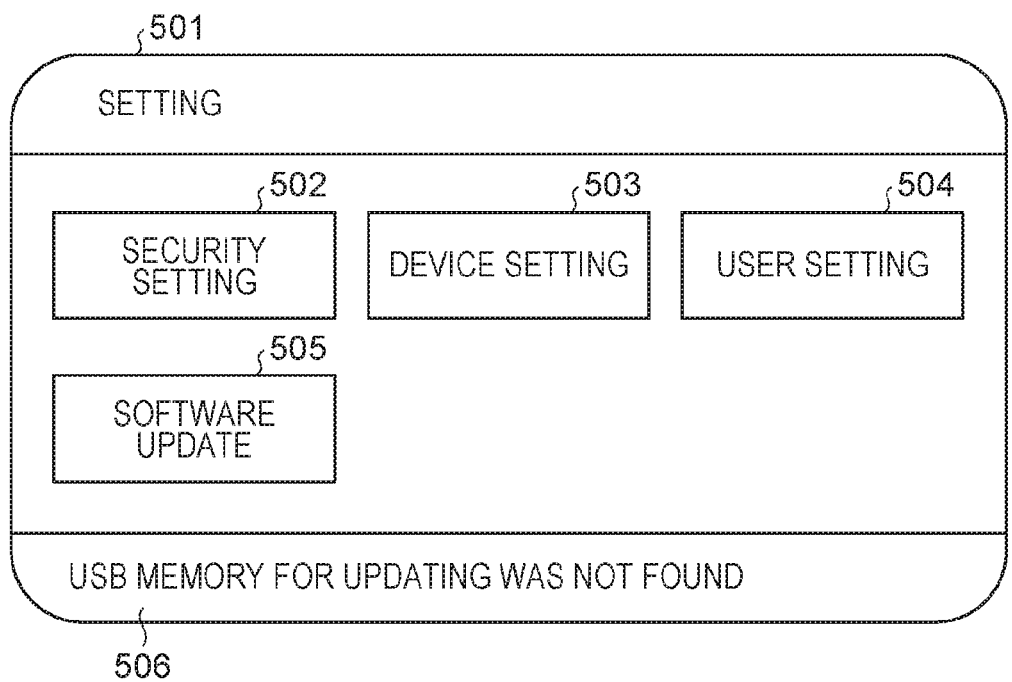
FIG. 6 is a diagram illustrating a configuration of a screen for use in setting.

FIG. 6 illustrates an example of the setting screen 501 displayed on the operation unit 102. The setting screen 501 is used by a user to issue various setting instructions. This screen itself includes no specific setting items, but the screen provides an intermediate stage for guiding to further detailed setting items. When a button 502 is pressed, a security setting screen 701 is opened. When a button 503 is pressed, a device setting screen (not illustrated) is opened. When a button 504 is pressed, a user setting screen (not illustrated) is opened. When a button 505 is pressed, updating of software is started. A message display area 506 is an area in which various messages to a user are displayed during the operation of the device.

Figure 7:
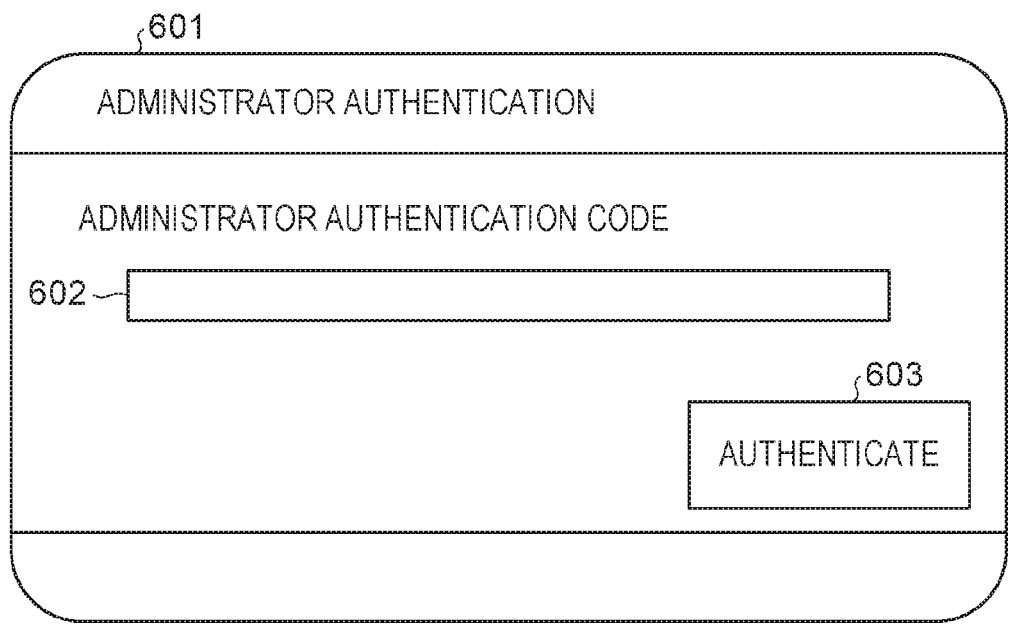
FIG. 7 is a diagram illustrating a configuration of a screen for use in setting.

FIG. 7 illustrates an example of an administrator authentication screen 601 displayed on the operation unit 102. The administrator authentication screen 601 is used by a user to input an administrator authentication code. This screen is displayed before a function that needs an administrative privilege is executed in order to confirm that an operator has an administrative privilege. For example, the administrator authentication screen 601 is displayed before the security setting screen 701 is displayed, or before updating of software is started when the button 505 is pressed. An area 602 is used by a user to input an administrator authentication code. When a button 603 is pressed, authentication of the authentication code input in the area 602 is started. The authentication of the authentication code is performed by the authentication unit 309. In a case where the authentication is successful, the process that needs the administrative privilege is executed. However, in a case where the authentication fails, the process that needs the administrative privilege is stopped.

Figure 8:
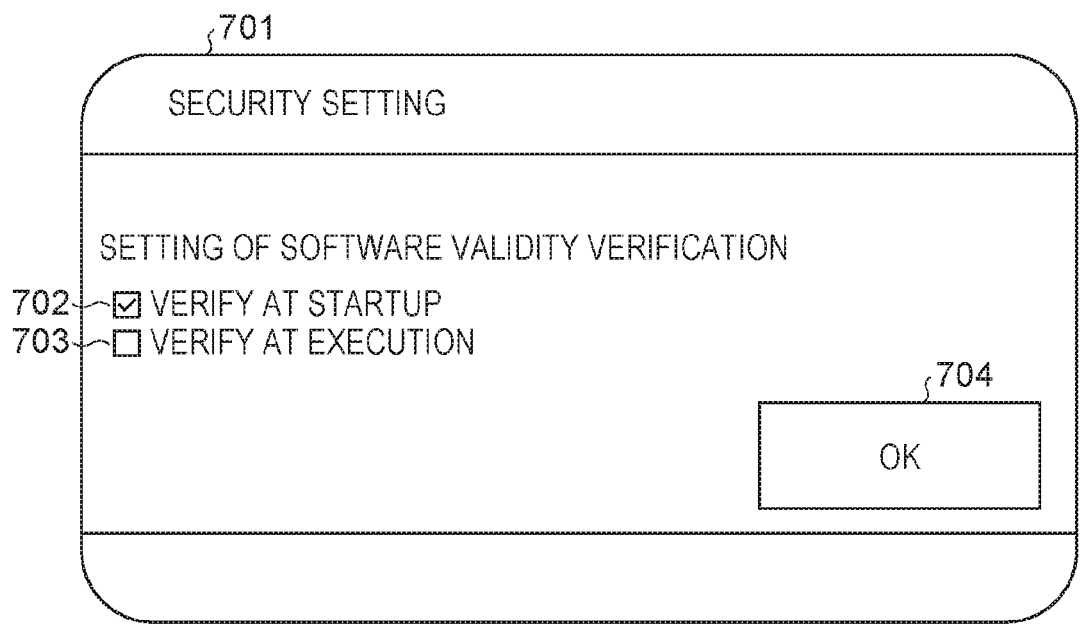
FIG. 8 is a diagram illustrating a configuration of a screen for use in setting.

FIG. 8 illustrates an example of the security setting screen 701 which is used in setting security of the MFP 100. In a case where a verify-at-startup checkbox is selected, a software verification function performed at system startup is enabled. In a case where a verify-at-execution checkbox is selected, a software verification function performed at function execution is enabled. When a button 704 is pressed, a selection state of the security setting screen 701 is stored as device setting in the data storage unit 302. The software verification function needs calculation time in verification, and thus executing of verification can result in a reduction in an operation speed of a device compared with a case where verification is not executed. That is, there can be a tradeoff between security and processing performance. An administrator may take this into account when setting an installation policy as well as a degree of satisfaction given to a user. Although the MFP 100 is a multi-user device, this security setting screen 701 is allowed to be operated only by a user having an administrative privilege. Although the setting is performed only by an administrator, the setting is set for all users.

Figure 9:
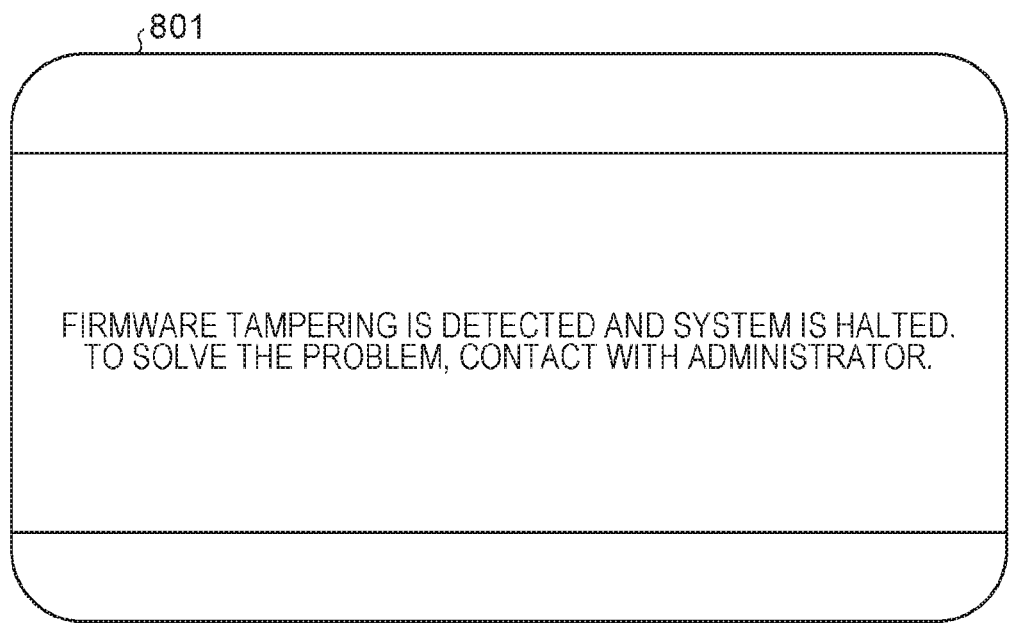
FIG. 9 is a diagram illustrating a configuration of a screen for use in setting.

FIG. 9 illustrates an example of an error screen 801 displayed on the operation unit 102. In this example, the screen displays a message indicating that firmware tampering is detected as a system error and the system is stopped. It is not allowed to move, from this screen, to a function execution screen to use the MFP 100.

Figure 10A:
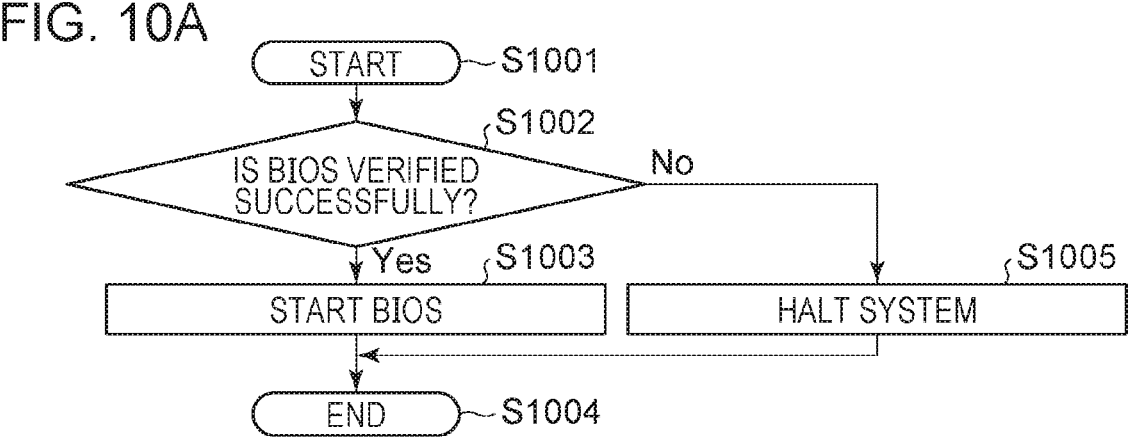
FIGS. 10A and 10B are flow charts illustrating a process performed in an MFP according to an embodiment.
Figure 10B:
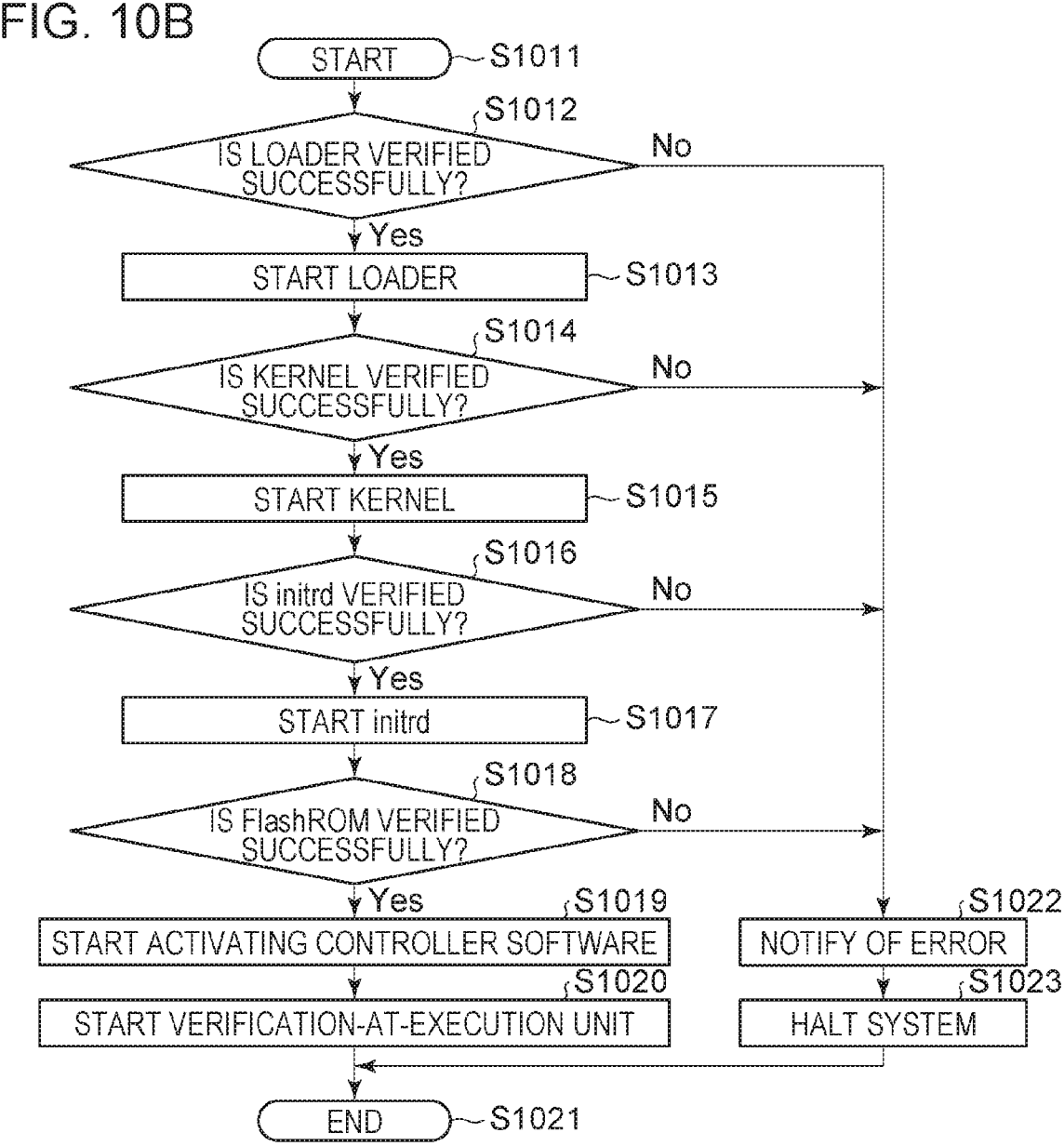

With reference to FIGS. 10A and 10B, an explanation is given as to a flow of a process of verifying software performed when the MFP 100 is started. The verification process illustrated in FIGS. 10A and 10B is executed only when the verification-at-startup checkbox 702 is selected. This process is performed once each time the MFP 100 is started. The process of the MFP 100 illustrated in FIG. 10A is actually performed by the BIOS verification unit 221. In the following description, the verification process illustrated in FIG. 10A is called a hardware verification. A process performed by the MFP 100 illustrated in FIG. 10B is performed such that after a program stored in the FlashROM211 is loaded by the CPU 201 into the DRAM 202, the process is performed via an operation process executed by the CPU 201. In the following description, the verification process illustrated in FIG. 10B is called a software verification. Note that the above-described two verification processes performed by the MFP 100 are different in that they are performed by different units in the MFP 100 and the hardware verification is not involved in the verification of software to be executed by the CPU 201.

When electric power is supplied and the startup process is started, the BIOS verification unit 221 is started and the BIOS verification process in started in S1001. In S1002, the MFP 100 performs the process of verifying the BIOS 360 and determines whether the verification is successful. In a case where the verification is successful, the process proceeds to S1003. However, in a case where the verification is not successful, the process proceeds to S1005. In the verification process, the signature of the BIOS 360 loaded by the BIOS verification unit 221 from the ROM 220 is verified using a public key disposed in the BIOS verification unit 221. In the present disclosure, the startup verification is a signature verification taking into account a startup order. That is, a signature entity verifies a signature of an entity to be started next thereby ensuring the security.

In S1003, the MFP 100 instructs the CPU 201 to start the BIOS 360. In S1005, the MFP 100 terminates the startup sequence without starting the BIOS thereby stopping the system. The BIOS verification unit 221 does not provide a notification because the BIOS verification unit 221 does not have a device for providing a notification to a user. However, an LED (Light Emitting Diode) may be connected to the BIOS verification unit 221 and a notification may be issued by turning on the LED. In S1004, the MFP 100 ends the process of verifying the BIOS 360. The hardware verification is a verification method implemented by hardware, and thus this verification process is not tampered with unless the integrated circuit is tampered with. That is, the hardware verification is an extremely robust verification method.

When the BIOS 360 is started, a process of verifying software stored in the FlashROM 211 is started in S1011. That is, the successful verification causes a process of verifying a next entity to start.

In S1012, the MFP 100 performs, using the loader load-and-verify unit 361, the process of verifying the loader 370 and determines whether the verification is successful. In a case where the verification is successful, the process proceeds to S1013. However, in a case where the verification is not successful, the process proceeds to S1022. In the verification process, the signature of the loader 370 loaded, as an entity to be started next, from the FlashROM 211 is verified using a public key possessed by the loader load-and-verify unit 361.

In S1013, the MFP 100 starts the loader. In S1014, the MFP 100 performs, using the kernel-and-initrd load-and-verify unit 371, the process of verifying the kernel 390 and determines whether the verification is successful. In a case where the verification is successful, the process proceeds to S1015. However, in a case where the verification is not successful, the process proceeds to S1022. In the verification process, the signature of the kernel 390 loaded, as an entity to be started next, from the FlashROM 211 is verified using a public key for verifying the kernel 390 possessed by the kernel-and-initrd load-and-verify unit 371. In S1015, the MFP 100 starts the kernel.

In S1016, the MFP 100 performs, using the kernel-and-initrd load-and-verify unit 371, the process of verifying the initrd 380, and determines whether the verification is successful. In a case where the verification is successful, the process proceeds to S1017. However, in a case where the verification is not successful, the process proceeds to S1022. In the verification process, the signature of the initrd 380 loaded, as an entity to be started next, from the FlashROM 211 is verified using a public key for verifying the initrd 380 possessed by the kernel-and-initrd load-and-verify unit 371. In S1017, the MFP 100 starts the initrd 380.

In S1018, the MFP 100 performs, using the startup verification unit 381, the process of verifying the controller software 300 and determines whether the verification is successful. In a case where the verification is successful, the process proceeds to S1020. However, in a case where the verification fails, the process proceeds to S1022. In the verification process, hash values of all respective program files included in the controller software 300, which have been loaded from the FlashROM211 and which are to be started next, are acquired from the list of correct answers in startup verification 321. Thereafter, hash values re-calculated for all respective program files loaded from the FlashROM211 are compared, on a file-by-file basis, with the hash values acquired from the list of correct answers in startup verification 321. In S1019, the MFP 100 starts a startup operation of the controller software 300. The controller software 300 includes a plurality of program files, and thus program files used in starting the system are sequentially started.

In S1020, the MFP 100 starts the verification-at-execution unit 322. In S1022, the MFP 100 displays an error screen 801 on the operation unit 102 thereby notifying a user that tampering has been detected. In S1023, the MFP 100 terminates the startup sequence thereby stopping the system. Note that in both S1022 and S1005, the system is stopped. However, alternatively, part of the functions may be disabled, and the manner of limiting the operation may not be stopping the system. In S1021, the MFP 100 ends the process of verifying the software stored in the FlashROM211.

In general, the software verification is a verification method implemented by a software program, and thus there is a possibility that this software program is tampered with by rewriting the software program stored in the storage unit. To handle this situation, as described above with reference to the flow, the software used in verification is verified in advance by another different constituent part thereby ensuring that the software used in verification is not tampered with. Each program in the programs is subjected sequentially to the software verification, thereby ensuring the security of the whole system based on the software verification on a previous program. Furthermore, by applying the software verification to the startup of the verification-at-execution unit, it becomes possible to increase the degree of robustness, based on the hardware verification, against the attack after the system is started.

Referring to FIG. 11, an explanation is given as to a flow of a process of verifying software performed when the MFP 100 executes a function. The verification process illustrated in FIG. 11 is executed only when the verification at execution checkbox 703 is selected. Note that this process is performed each time a function shown in FIG. 4 is executed unlike the process shown in FIG. 10B which is executed only once at the startup. By performing re-verification on software, which has already been subjected to the startup verification, when a function is executed, it becomes possible to detect tampering even when the tampering is performed in a period after the startup to the execution of the function.

Only verification at the execution of a function does not provide a robust verification based on the hardware verification, and thus, to achieve a robust reliability, it is necessary to perform both the verification at the startup and the verification at the execution. Any process performed by the MFP 100 illustrated in FIG. 11 is performed such that after a corresponding program stored in the FlashROM211 is loaded by the CPU 201 into the DRAM 202, the process is performed via an operation process executed by the CPU 201. In order to distinguish the software verification process illustrated in FIG. 11 from the software verification process illustrated in FIG. 10B, the software verification process illustrated in FIG. 11 may also be referred to as a program verification process.

When the MFP 100 executes a function, it is necessary to start a program file corresponding to necessary software. Before starting the program file, a process of verification at function execution is started in S1101. For example, when a user presses the button 402 to start the copy function, a program file necessary in executing the copy function is verified and then started. In the first embodiment, the MFP 100 is taken as an example of an information processing apparatus, and thus, in the software verification, programs for achieving image forming functions such as a copy function, a scan function, or the like are subjected to the software verification.

In S1102, the MFP 100 verifies, using the verification-at-execution unit 322, a program to be started, and determines whether the verification is successful. In a case where the verification is successful, the process proceeds to S1103. However, in a case where the verification is not successful, the process proceeds to S1105. In the verification process, the verification-at-execution unit 322 refers to the white list for verification at execution 323 and determines a hash value corresponding to the program to be started. This hash value is compared with a hash value recalculated from the program file stored in the FlashROM 211, thereby verifying the program file to be started. In a case where a hash value corresponding to the program to be started is not obtained from the white list for verification at execution 323, it is determined that the program is an unknown program and the verification has failed.

In S1103, the MFP 100 starts a program of interest. In S1105, the MFP 100 determines, using the verification-at-execution unit 322, whether the program of interest is a known program. In a case where the program of interest is a known program, the process proceeds to S1107. In a case where the program of interest is an unknown program, the process proceeds to S1106. The program of interest can be an unknown program when, in S1102, determining of a hash value of a program to be started is unsuccessful which indicates that the program of interest is not a program that is added to the system via a valid procedure by the software update unit 310. In order to prevent an unauthorized alteration, the system generally has a mechanism to allow only the software update unit 310 to add a program. Therefore, even when an unauthorized program is put in the system using some security flaw of the system, it is possible to prevent the unauthorized program from being executed. Such a blocking mechanism to prevent an attack is necessary to ensure that a user is allowed to securely use the system in performing a highly confidential job.

In a state in which a known program is tampered with, a software part necessary in controlling the system is damaged, which makes it impossible to guarantee the operation of the system. Therefore, it is necessary to stop the whole system. In a case where the only error is a program being determined to be an unknown program, all of the software parts necessary in controlling the system are in a normal state. Therefore, it is allowed to continue the operation without stopping the system.

In S1106, the MFP 100 displays, in a message display area 406 of the operation unit 102, a message to inform a user that a system continuation error occurs and execution of an unknown program is blocked. In this case, various buttons on the menu screen 401 are still enabled, and the MFP 100 continues to operate as the system. In S1107, the MFP 100 displays an error screen 801 on the operation unit 102 thereby notifying a user that tampering has been detected and the system is stopped. Although in this example, the operation of the system is stopped as the restriction, the restriction of the operation may be imposed in another way other than the stopping.

In S1108, using the network control unit 307, the MFP 100 stops receiving a job via a network. The operation unit 102 is forced to stay in the error screen 801 without being allowed to move to another screen, and the MFP 100 stops the operation as the system. In S1104, the MFP 100 ends the verification-at-execution process.

Figure 12:
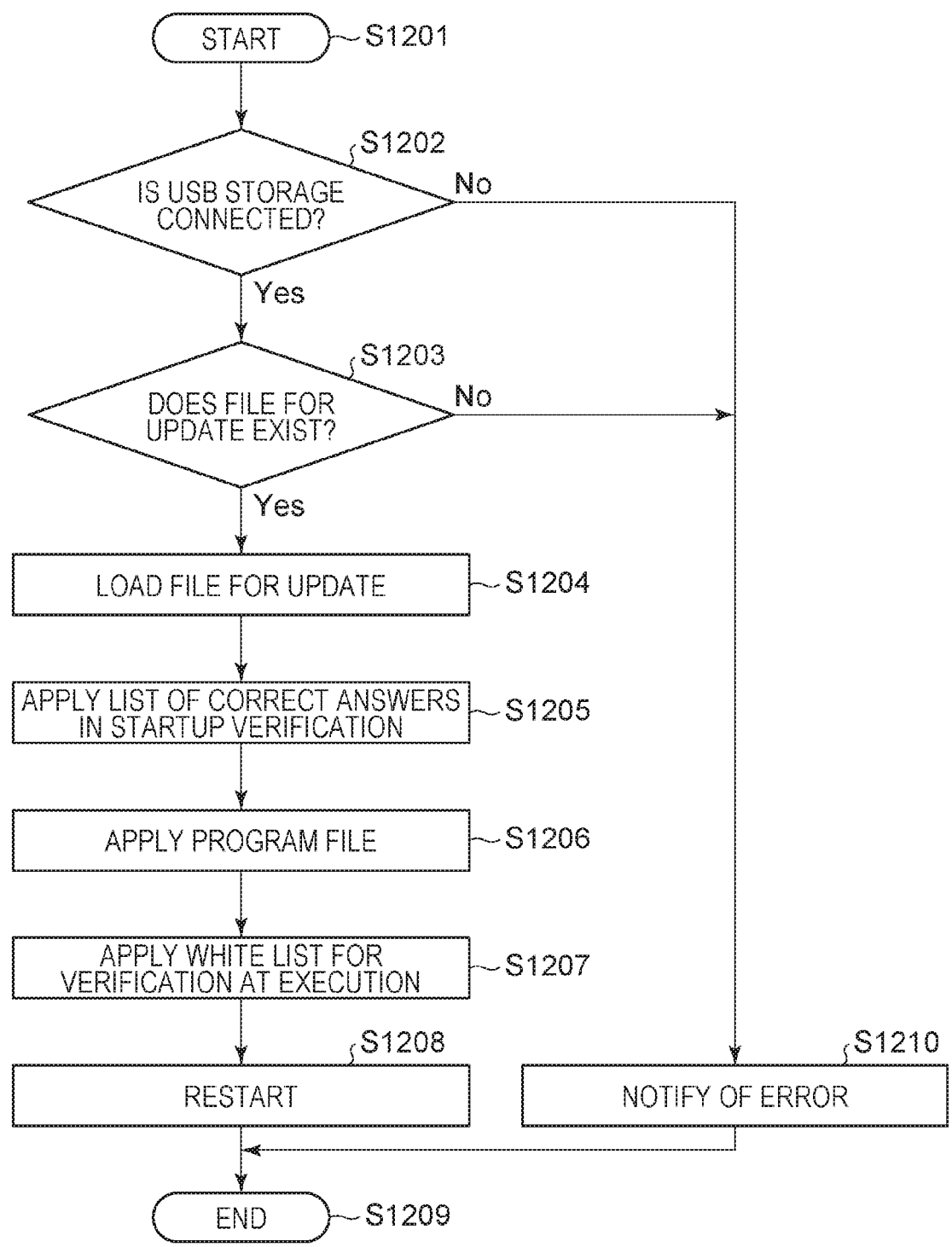
FIG. 12 is a flow chart illustrating a process performed in an MFP according to an embodiment.

With reference to FIG. 12, an explanation is given as to a flow of a process of updating the controller software 300 performed by the MFP 100. A process performed by the MFP 100 illustrated in FIG. 12 is performed such that after a program stored in the FlashROM211 is loaded by the CPU 201 into the DRAM 202, and then the process is performed via an operation process executed by the CPU 201. When an instruction to update software is issued by pressing the button 505, administrator authentication is performed on the administrator authentication screen 601. If the authentication is passed successfully, then in S1201 the MFP 100 starts the software update process.

In S1202, the MFP 100 determines, using the USB control unit 311, whether a USB storage has been connected. In a case where it is determined that a USB storage has been connected, the process proceeds to S1203. However, in a case where it is determined that no USB storage has been connected, the process proceeds to S1210. In S1203, the MFP 100 determines, using the USB control unit 311, whether a file for update exists in the USB storage. In a case where it is determined that a file for update exists in the USB storage, the process proceeds to S1204. However, in a case where it is determined that no file for update exists in the USB storage, the process proceeds to S1210. Note that in the process described above, a file name, a file format, a file signature, or the like may be verified to ensure that the file for update is valid.

In S1204, the MFP 100 loads, using the USB control unit 311, the file for update existing in the USB storage into a temporary area in the FlashROM 211 using the data storage unit 302. In S1205, the MFP 100 reflects data by using the data storage unit 302 such that a new list of correct answers in startup verification 321 included in the file for update is reflected on the list of correct answers in startup verification storage area in the FlashROM 211.

In S1206, the MFP 100 reflects data using the data storage unit 302 such that a program file included in the file for update is reflected on the program storage area in the FlashROM 211. The reflecting of the program file may be performed based on a difference file or may be performed for all files including files that are not necessary to be changed.

In S1207, the MFP 100 reflects data using the verification-at-execution unit 322 such that the program file reflected in S1206 is reflected on the white list for verification at execution 323. The white list for verification at execution 323 is data including a file name of a program file, a file path, and a hash value. In a case where the device of interest has an extension function that allows an application to be added, when an application is added, the software update unit 310 adds information relating to the application to the white list for verification at execution 323. This makes it possible to detect tampering of software even if the device allows an additional application to be added.

In S1208, the MFP 100 restarts the system. When the system is restarted, the startup verification process illustrated in FIG. 9 is performed.

In S1210, the MFP 100 displays an error message in the message display area 506 displayed on the operation unit 102. In S1209, the MFP 100 ends the software update process.

Figure 13:
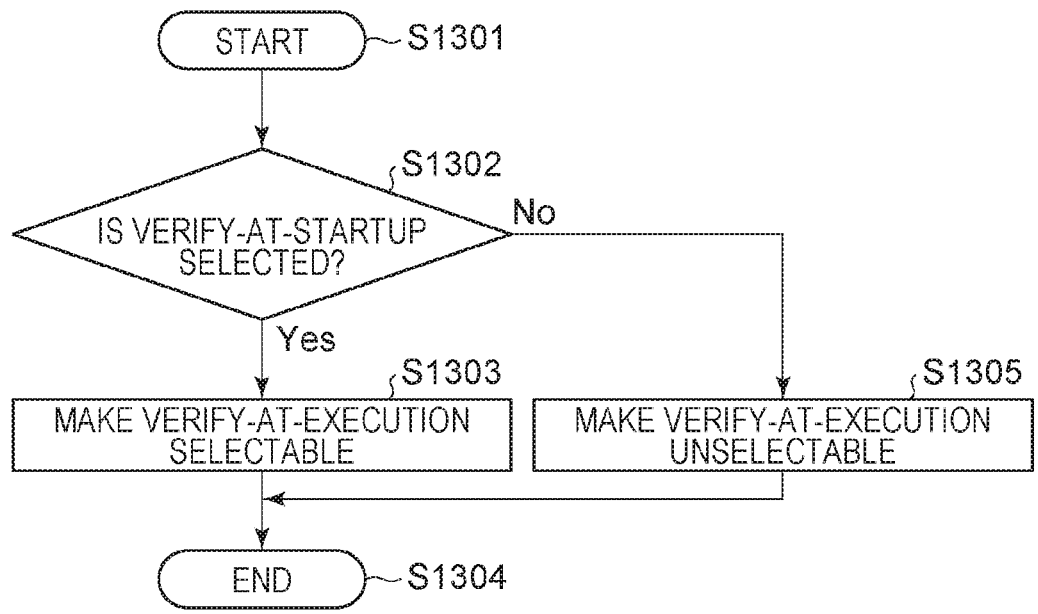
FIG. 13 is a flow chart illustrating a process performed in an MFP according to an embodiment.

With reference to FIG. 13, an explanation is given as to a flow of a process performed by the MFP 100 to control setting items of the security setting screen 701. When the MFP 100 displays the security setting screen 701 or when a user changes the selection state of the verification-at-startup checkbox 702, the MFP 100 starts the setting item control process in S1301. Note that at a point of time immediately after the security setting screen 701 is displayed, the selection state of the verification-at-startup checkbox 702 and the selection state of the verify-at-execution checkbox 703 depend on the setting states stored in the data storage unit 302.

In S1302, the MFP 100 determines whether the verify-at-startup checkbox 702 is selected. In a case where the verify-at-startup checkbox 702 is selected, the process proceeds to S1303. However, in a case where the verify-at-startup checkbox 702 is not selected, the process proceeds to S1305. In S1303, the MFP 100 sets the verify-at-execution checkbox 703 to be a selectable screen component. In S1305, the MFP 100 sets the verify-at-execution checkbox 703 to be an unselectable screen component. In S1304, the MFP 100 ends the setting item control process.

Although the startup verification and the verification at execution make it possible to enhance the reliability, this can result in a reduction in operation speed. The balance between the reliability and the operation speed may be selected flexibly by a user. Although the startup verification of hardware verification can guarantee high security even when only the startup verification is executed, the verification at execution alone cannot guarantee high security unless the startup verification of hardware verification is also executed. By providing screen components for setting items of the respective startup verification and the verification at execution, it becomes possible for a user to properly select a safe combination by controlling the screen components. By performing the process described above, it becomes possible for a user to use the MFP 100 with the guaranteed reliability of the verification at execution ensured by the startup verification.

As described above, the high-reliability verification method according to the first embodiment ensures validity of software, which in turn ensures validity of control software of a device, and thus a user is allowed to use the device securely.

Second Embodiment

A second embodiment of the present disclosure is described below with reference to drawings. In the following description of the second embodiment, a method of controlling the security setting screen 701 according to another aspect is disclosed. Note that a duplicated description of similar units and similar processes to those in the first embodiment is omitted.

Figure 14A:
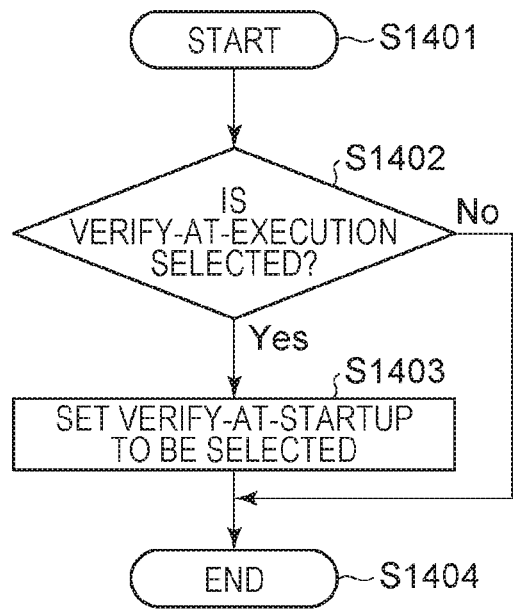
FIGS. 14A and 14B are flow charts illustrating a process performed in an MFP according to an embodiment.
Figure 14B:
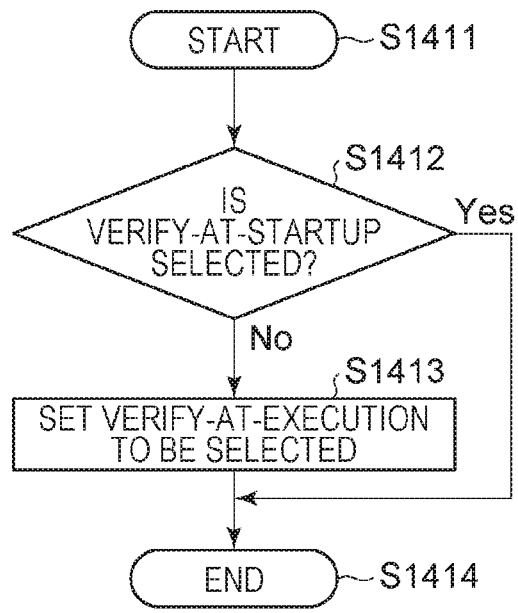

With reference to FIGS. 14A and 14B, an explanation is given as to a flow of a process performed by the MFP 100 to control setting items of the security setting screen 701. Note that at a point of time immediately after the security setting screen 701 is displayed, the selection state of the verification-at-startup checkbox 702 and the selection of the verify-at-execution checkbox 703 depend on the setting states stored in the data storage unit 302.

When a user changes the selection state of the verify-at-execution checkbox 703, the MFP 100 starts the setting item control process in S1401. In S1402, the MFP 100 determines whether the verify-at-execution checkbox 703 is selected. In a case where the verify-at-execution checkbox 703 is selected, the process proceeds to S1403. However, in a case where the verify-at-execution checkbox 703 is not selected, the process proceeds to S1404. In S1403, the MFP 100 sets the verify-at-startup checkbox 702 to a selected state. In S1404, the MFP 100 ends the setting item control process.

When a user changes the selection state of the verification-at-startup checkbox 702, the MFP 100 starts the setting item control process in S1411. In S1412, the MFP 100 determines whether the verify-at-startup checkbox 702 is selected. In a case where the verify-at-startup checkbox 702 is selected, the process proceeds to S1414. However, in a case where the verify-at-startup checkbox 702 is not selected, the process proceeds to S1413. In S1413, the MFP 100 sets the verify-at-execution checkbox 703 to an unselected state. In S1414, the MFP 100 ends the setting item control process. By controlling the selection states of screen components corresponding to the setting items such that the selection states of the screen components are automatically changed in response to an operation performed by a user, it becomes possible for the user to properly select the tradeoff between the reliability and the operation speed such that both high security and a stress-free operation speed are obtained. By performing the process described above, it becomes possible for a user to use the MFP 100 with the guaranteed reliability of the verification at execution ensured by the startup verification.

Other Embodiments

Embodiments of the present disclosure can also be realized by a computer of a system or apparatus that reads out and executes computer executable instructions recorded on a storage medium (e.g., non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2018-080775, filed Apr. 19, 2018 which is hereby incorporated by reference herein in its entirety.

What is claimed is:

1. An information processing apparatus comprising:
a memory; and
a processor in communication with the memory and configured to perform operations including:
performing, as a hardware verification, at least a verification of a startup program stored in read only memory,
storing a plurality of programs that includes a plurality of control programs and a plurality of function programs, wherein the plurality of control programs includes at least a kernel and a loader, and the plurality of function programs includes at least an application program,
displaying a screen for receiving a first setting of whether to perform verification at startup for performing verification when the information processing apparatus is started up and a second setting of whether to perform verification at execution for performing verification when the plurality of function programs are executed,
performing control so that the second setting of the verification at execution is receivable via the screen in a case where the verification at startup is set via the screen, and performing control so that the second setting of the verification at execution is not received via the screen in a case where the verification at startup is not set via the screen,
receiving, via the screen, (i) the first setting of performing the verification at startup and the second setting of not performing the verification at execution, or (ii) the first setting of performing the verification at startup and the second setting of performing the verification at execution,
performing, in the case where the verification at startup is set via the screen, a first verification process including the verification of the startup program by using the hardware verification, and performing, in a case where the verification of the startup program is successful, a software verification by the first verification process of the stored plurality of control programs and the stored plurality of function programs stored in the storage unit,
restricting use of the information processing apparatus in a case where a verification by the first verification process fails,
performing, in a case where the verification at execution is set via the screen, a second verification process after the verification by the first verification process succeeds and startup of the information processing apparatus is completed, wherein, in a case where a particular function is executed, the second verification process is a process of verifying one or more function programs of the plurality of function programs based on the executed particular function, and
restricting use of at least a function program for executing the particular function in a case where a verification by the second verification process fails,
wherein the second verification process is not executed in the case where the verification by the first verification process fails or in a case where the startup of the information processing apparatus is not completed.

2. The information processing apparatus according to claim 1,
wherein, the case where the verification by the second verification process fails, restricting use of at least the function program includes disabling use of at least the function program for executing the particular function, and
wherein, when the use of the function program for executing the particular function is disabled, a notification to notify that tampering has been detected is displayed on a notification screen of the information processing apparatus.

3. The information processing apparatus according to claim 1,
wherein the first verification process is performed when electric power is supplied to the information processing apparatus and the startup of the information processing apparatus is initiated, and
wherein the second verification process is performed when an instruction to execute the particular function of the information processing apparatus is issued.

4. The information processing apparatus according to claim 1,
wherein, in the software verification by the first verification process, the software verification is performed on the plurality of programs sequentially on a program-by-program basis in a program start order, and
wherein, when the software verification fails for any one of the plurality of programs, use of the information processing apparatus is restricted.

5. The information processing apparatus according to claim 4, wherein, in the software verification by the first verification process, for a control program included in the plurality of control programs to be started next, a hash value is calculated and is compared with a hash value associated with a control program included in the plurality of control programs verified immediately before.

6. The information processing apparatus according to claim 1, wherein, in the software verification by the second verification process, a hash value is calculated for each of the one or more function programs of the plurality of function programs corresponding to the particular function which is selected by a user, and the calculated hash value is compared with a hash value included in a list of second hash values stored for use by the second verification process.

7. The information processing apparatus according to claim 6,
wherein, in a case where the software verification by the second verification process fails, restricting use of the information processing apparatus includes determining whether a function program which failed the second verification process is a known function program, and
wherein, in a case where it is determined that the function program which failed the second verification process is not a known function program, restricting use of the information processing apparatus includes not restricting use of the information processing apparatus but notifying that executing of an unknown function program has been restricted.

8. The information processing apparatus according to claim 1, wherein the startup program verified by the hardware verification unit is a Basic Input/Output System (BIOS).

9. The information processing apparatus according to claim 8,
wherein a loader load-and-verify program is included in the BIOS, and the loader load-and-verify program includes a public key corresponding to a process of verifying the loader and a signature assigned to the loader, and
wherein the BIOS also includes a process of loading the stored loader and starting the loaded loader.

10. The information processing apparatus according to claim 1, wherein the read only memory and the processor are connected by a bus which is internal to an integrated circuit and not accessible outside of the integrated circuit.

11. The information processing apparatus according to claim 1, further comprising:
an operation unit;
a printer unit; and
a scanner unit,
wherein the plurality of function programs includes at least a copy function, a scanning function, and a printing function.

12. A method for controlling an information processing apparatus, the method comprising:
performing, as a hardware verification, at least a verification of a startup program stored in read only memory;
storing a plurality of programs that includes a plurality of control programs and a plurality of function programs, wherein the plurality of control programs includes at least a kernel and a loader, and the plurality of function programs includes at least an application program;
displaying a screen for receiving a first setting of whether to perform verification at startup for performing verification when the information processing apparatus is started up and a second setting of whether to perform verification at execution for performing verification when the plurality of function programs are executed;
performing control so that the second setting of the verification at execution is receivable via the screen in a case where the verification at startup is set via the screen, and performing control so that the second setting of the verification at execution is not received via the screen in a case where the verification at startup is not set via the screen;
receiving, via the screen, (i) the first setting of performing the verification at startup and the second setting of not performing the verification at execution, or (ii) the first setting of performing the verification at startup and the second setting of performing the verification at execution;
performing, in the case where the verification at startup is set via the screen, a first verification process including the verification of the startup program by using the hardware verification, and performing, in a case where the verification of the startup program is successful, a software verification by the first verification process of the stored plurality of control programs and the stored plurality of function programs;
restricting use of the information processing apparatus in a case where a verification by the first verification process fails;
performing, in a case where the verification at execution is set via the screen, a second verification process after the verification by the first verification process succeeds and startup of the information processing apparatus is completed, wherein, in a case where a particular function is executed, the second verification process is a process of verifying one or more function programs of the plurality of function programs based on the executed particular function; and
restricting use of at least a function program for executing the particular function in a case where a verification by the second verification process fails,
wherein the second verification process is not executed in the case where the verification by the first verification process fails or in a case where the startup of the information processing apparatus is not completed.

13. The method according to claim 12,
wherein, in the case where the verification by the second verification process fails, restricting use of at least the function program includes disabling use of at least the function program for executing the particular function, and
wherein, when the use of the function program for executing the particular function is disabled, a notification to notify that tampering has been detected is displayed on a notification screen of the information processing apparatus.

14. The method according to claim 12,
wherein the first verification process is performed when electric power is supplied to the information processing apparatus and the startup of the information processing apparatus is initiated, and
wherein the second verification process is performed when an instruction to execute the particular function of the information processing apparatus is issued.

15. The method according to claim 12,
wherein, in the software verification by the first verification process, the software verification is performed on the plurality of programs sequentially on a program-by-program basis in a program start order, and wherein, when the software verification fails for any one of the plurality of programs, use of the information processing apparatus is restricted.

16. The method according to claim 15, wherein, in the software verification by the first verification process, for a control program included in the plurality of control programs to be started next, a hash value is calculated and is compared with a hash value associated with a control program included in the plurality of control programs verified immediately before.

17. The method according to claim 12, wherein, in the software verification by the second verification process, a hash value is calculated for each of the one or more function programs of the plurality of function programs corresponding to the particular function which is selected by a user, and the calculated hash value is compared with a hash value included in a list of second hash values stored for use by the second verification process.

18. The method according to claim 17,
wherein, in a case where the software verification by the second verification process fails, restricting use of the information processing apparatus includes determining whether a function program which failed the second verification process is a known function program, and
wherein, in a case where it is determined that the function program which failed the second verification process is not a known function program, restricting use of the information processing apparatus includes not restricting use of the information processing apparatus but notifying that executing of an unknown function program has been restricted.

19. The method according to claim 12, wherein the startup program verified by the hardware verification is a Basic Input/Output System (BIOS).

20. A non-transitory computer-readable storage medium storing a program to cause a computer to perform a method for controlling an information processing apparatus, the method comprising:
performing, as a hardware verification, at least a verification of a startup program stored in read only memory;
storing a plurality of programs that includes a plurality of control programs and a plurality of function programs, wherein the plurality of control programs includes at least a kernel and a loader, and the plurality of function programs includes at least an application program;
displaying a screen for receiving a first setting of whether to perform verification at startup for performing verification when the information processing apparatus is started up and a second setting of whether to perform verification at execution for performing verification when the plurality of function programs are executed;
performing control so that the second setting of the verification at execution is receivable via the screen in a case where the verification at startup is set via the screen, and performing control so that the second setting of the verification at execution is not received via the screen in a case where the verification at startup is not set via the screen;
receiving, via the screen, (i) the first setting of performing the verification at startup and the second setting of not performing the verification at execution, or (ii) the first setting of performing the verification at startup and the second setting of performing the verification at execution;
performing, in the case where the verification at startup is set via the screen, a first verification process including the verification of the startup program by using the hardware verification, and performing, in a case where the verification of the startup program is successful, a software verification by the first verification process of the stored plurality of control programs and the stored plurality of function programs;
restricting use of the information processing apparatus in a case where a verification by the first verification process fails;
performing, in a case where the verification at execution is set via the screen, a second verification process after the verification by the first verification process succeeds and startup of the information processing apparatus is completed, wherein, in a case where a particular function is executed, the second verification process is a process of verifying one or more function programs of the plurality of function programs based on the executed particular function; and
restricting use of at least a function program for executing the particular function in a case where a verification by the second verification process fails,
wherein the second verification process is not executed in the case where the verification by the first verification process fails or in a case where the startup of the information processing apparatus is not completed.

* * * * *